United States Patent
Ohta

(10) Patent No.: US 7,391,022 B2
(45) Date of Patent: Jun. 24, 2008

(54) SCANNING PROBE MICROSCOPE

(75) Inventor: Masahiro Ohta, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 344 days.

(21) Appl. No.: 11/368,204

(22) Filed: Mar. 2, 2006

(65) Prior Publication Data

US 2006/0219899 A1    Oct. 5, 2006

(30) Foreign Application Priority Data

Mar. 9, 2005    (JP)    ............................. 2005-066193

(51) Int. Cl.
*G01N 23/00*    (2006.01)
*G01N 13/16*    (2006.01)

(52) U.S. Cl. ..................... 250/306; 250/309; 250/310; 73/105

(58) Field of Classification Search ................. 250/306, 250/309, 310

See application file for complete search history.

(56) References Cited

U.S. PATENT DOCUMENTS 7,333,191 B2 *    2/2008    Murayama et al. .......... 356/150
2006/0284084 A1 *   12/2006    Morimoto et al. .......... 250/309

* cited by examiner

*Primary Examiner*—Nikita Wells
(74) *Attorney, Agent, or Firm*—J.C. Patents

(57) ABSTRACT

A scanning probe microscope (SPM) is provided capable of a narrow to a wide range observation according to observed targets or purposes without replacing a scanner while maintaining a high resolution. The SPM is provided with a probe-side scanner 10 and a sample-side scanner 11. The probe-side scanner 10 is to move the probe 13 in X-, Y-, Z-axis directions, and the sample-side scanner 11 is to move the sample 12 in the X-, Y-, Z-axis directions. A scanner with a small maximum scan range is used as the probe-side scanner 10; a scanner with a large maximum scan range is used as the sample-side scanner 11; and both can be switched between each scanner for use according to the observed targets or purposes. Alternatively, the probe-side scanner 10 is used for scanning in a narrow range, and the sample-side scanner 11 is used to move the field of view.

9 Claims, 2 Drawing Sheets

SCANNING PROBE MICROSCOPE

BACKGROUND OF THE INVENTION

1. Field of Invention

The present invention relates to a scanning probe microscope (SPM).

2. Description of Related Art

A scanning probe microscope (SPM) scans a sample surface with a tiny probe, and detects an interaction between the tiny probe and the sample, so as to detect and to image a shape or physical quantity of the sample surface. One type of the SPM is scanning tunneling microscope (STM), in which the type of interaction measured is an electrical current flowing between the probe and the sample. Another type of the SPM includes atomic force microscope (AFM), in which the atomic force between the probe and the sample is monitored.

FIG. 3 shows a structure of the major parts of a conventional AFM (for example, referring to Japanese Laid-Open Application No. 2000-338027 ([0003], [0004], FIG. 7)). The conventional AFM includes a cantilever 34 with a sharp probe 33 at the front end, a displacement detection system for detecting a displacement of the cantilever 34, and a three-dimensional scanner (3D scanner) 31 for carrying a sample 32 thereon and moving the sample 32 along the X-Y-Z axis directions. When the front end of the probe 33 is relatively close (with a gap less than several nanometers) to the sample 32 mounted on the 3D scanner 31, an atomic force (attractive force or repulsive force) is present between atoms of the front end of the front probe 33 and atoms of the sample 32. On one hand, the scanner 31 is used for scanning the sample, such that the probe 33 moves relatively along the sample 32 surface within an X-Y plane. On the other hand, the scanner is used to move the sample in the z-axis direction such that a constant atomic force between the probe 33 and the sample 32 is maintained by feedback controlling the distance between the probe 33 and the sample 32 (the height in a Z-axis direction). The feedback in the Z-axis direction corresponds to a surface topography of the sample 32, and a three-dimensional image of the sample surface is obtained accordingly.

The displacement detection system is used to detect a displacement of the cantilever 34 in the Z-axis direction, which includes a laser source 35 for irradiating a laser beam to the vicinity of the front end of the cantilever 34, and an optical detector 36 for detecting the laser beam reflected by the cantilever 34 etc. By detecting the bending angle of the cantilever 34 according to an optical lever principle, the up and down movements of the cantilever 34 can be detected.

In the SPM, besides configuring the 3D scanner to carry the sample and to move the sample for making observations, a 3D scanner 30 can be also installed on the cantilever 34, and the probe 33 is moved by the 3D scanner 30 for making observations as shown in FIG. 4. In such a case, according to the signals from the displacement detection system, the displacement of the 3D scanner 30 in the Z-axis direction is feedback controlled in a manner that the atomic force between the probe 33 and the sample 32 is maintained constant, while a three-dimensional image of the sample surface is obtained by scanning along the sample 32 surface within the X-Y plane.

A scanner is generally a cylindrical body that includes piezoelectric elements, and moves freely in X-axis, Y-axis, and Z-axis directions, respectively, within a preset range under an externally-applied voltage. An observable range of the SPM is determined by the movable range (i.e., maximum scanning range) of the scanner in the X-Y axis direction. A scanner with a relatively large maximum scan range can ensure a relatively large observation range. To extend the maximum scan range of a scanner, the size of a scanner can be increased. On the other hand, to obtain an image with a high resolution, and to enhance the sturdiness of the whole device, the size of the scanner must be reduced. That is, it is generally difficult for a scanner with a relatively large maximum scan range to yield an image with a high resolution. Accordingly, it is difficult to ensure both a relatively large observation range and a high resolution at the same time.

Therefore, in the SPM, scanners with different maximum scan ranges must be used separately according to the observed targets or purposes. However, a problem in which the time-consuming practice of replacing scanners and the subsequent changing of settings will occur.

Also, in recent years, to correct the scale error caused by the non-linearity of the piezoelectric elements, a scanner incorporated with a position sensor has been widely used. The displacement of the scanner can be detected by the position sensor, and the displacement signal is fed back to the scanner's driving mechanism, thereby obtaining an image over a large area while maintaining the linear state. However, being incorporated with the position sensor, the device is further enlarged in size. Consequently, it is difficult to make observation at high resolution.

Also, the field of view is moved as time passes by, due to the heat drift of the sample in the SPM. Therefore, the extent that the field of view is moved by the heat drift, etc., is generally detected based on the obtained image and is corrected by the scanner, such that the observation can be resumed in the same field of view. However, when a small scanner is used for observation with a high resolution, and as the maximum scan range being smaller, the displacement of the field of view cannot be completely corrected during a long observation period. Occasionally, the desired area to be observed is moved outside of the field of view.

SUMMARY OF THE INVENTION

Accordingly, an object of the present invention is to provide a scanning probe microscope (SPM), used for making observation from a narrow to a wide range without replacing scanners. Moreover, another object of the present invention is to provide a SPM, used for observing in a wide range and maintaining a linear observation, and observing for a long time period in the same field of view while maintaining a high resolution.

For solving the above problems, the present invention provides a scanning probe microscope, used to scan the sample surface with a tiny probe, and to detect a three-dimensional shape and physical quantity of the sample surface. The SPM includes a) a probe moving device, for moving the probe in X-, Y-, and Z-axis directions; and b) a sample moving device, for moving the sample in the X-, Y-, and Z-axis directions.

Furthermore, it is preferred that the movable range of the sample moving mechanism in the X-Y axis directions is larger than that of the probe moving mechanism in the X-Y axis directions.

According to the first aspect of the present invention, the scanning microscope can further comprise c) a narrow range observing unit, for obtaining data of physical parameters the sample surface by utilizing the probe moving device; and d) a wide range observing unit, for obtaining data of the sample surface by utilizing the sample moving mechanism. The coverage of a field of view can be changed through exchanging the narrow range observing unit with the wide range observing unit.

According to the second aspect of the present invention the scanning probe microscope can further comprise c) a narrow range observing unit, for obtaining data of the sample surface by utilizing the probe moving device; and d) a view-field moving unit, for moving the field of view by utilizing the sample moving device. Accordingly, the field of view is moved by the view-field moving unit; and the data of the sample surface is obtained by the narrow range observing unit.

According to the third aspect of the present invention, the scanning probe microscope can further comprise e) a position sensor, for detecting a position of the sample moving device and f) a non-linearity correction unit, for correcting the non-linearity of the sample moving device, according to information on the position of the sample moving device detected by the position sensor.

According to the fourth aspect of the present invention, the scanning probe microscope can further comprise g) a drift detection unit, for detecting a displacement direction and a magnitude of the displacement of the field of view due to the heat drift; and h) a drift correction unit, for correcting the heat drift by controlling the sample moving device according to the displacement direction and the displaced distance of the field of view detected by the drift detection unit.

According to the SPM with the above structure of the present invention, the sample and the probe can be respectively moved in the X-, Y- and Z-axis directions by using the sample moving device and the probe moving device. Therefore, various observations that are difficult to be implemented with the prior art can be achieved.

For example, in the first aspect of the SPM of the present invention, the probe moving device with a small movable range (i.e., a small maximum scan range) in the X-Y axis direction and a sample moving device with a large movable range (i.e., a large maximum scan range) in the X-Y axis direction can be switched alternatively. The former one is used for observing in a narrow range, while the latter one is used for observing in a wide range. Therefore, replacing scanners according to the observed targets or purposes as before can be precluded to conserve the time for replacing scanners or changing settings.

Also, in the second aspect of the SPM according to the present invention, the probe moving device with a small movable range in the X-Y axis direction and the sample moving device with a large movable range in the X-Y axis direction are used together. The probe moving device is used for a narrow range scanning; the sample moving device is used to move the field of view, such that it is possible to make observation from a narrow to a wide range, while a high resolution is maintained.

In the third aspect of the SPM of the present invention, a position sensor is provided, for detecting a position of the sample moving device with a large movable range in the X-Y axis direction, and for feedback controlling the sample moving device according to the position information. The non-linearity of the scanner is thereby compensated, and a linear image is obtained when scanning in a wide range.

In the fourth aspect of the SPM of the present invention, a drift detection unit is provided for detecting the displacement direction and the displaced distance of the field of view caused by the heat drift; and a drift correction unit is also provided for making the sample moving device move, so as to counter the displacement of the field of view with the sample moving device. Therefore, a probe moving device suitable for a narrow range scanning is used for observation, and the sample moving device is used for correcting the drift in order for the same field of view be maintained for a long period of time while making an observation at high resolution.

In order to make aforementioned and other objects, features and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The preferable configurations for implementing a scanning probe microscope (SPM) of the present invention will be illustrated below through embodiments.

Embodiment 1

Figure 1:
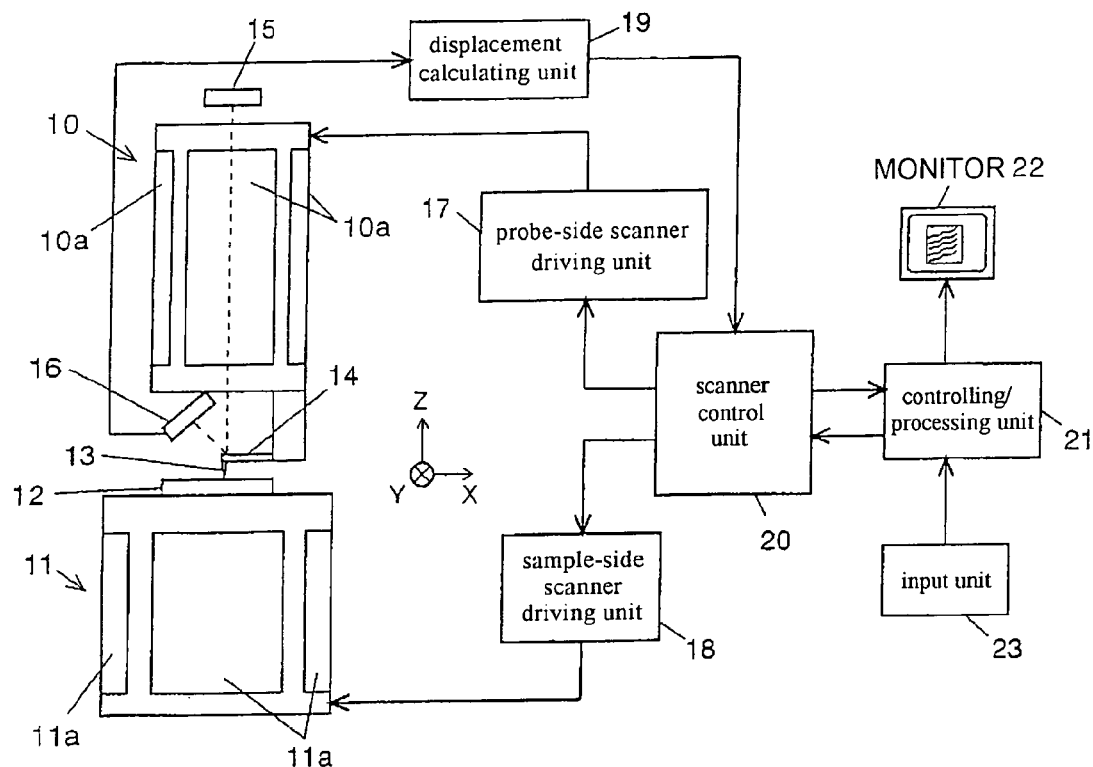
FIG. 1 is a schematic structure view of an atomic force microscope (AFM) according to the first embodiment of the present invention.
Figure 2:
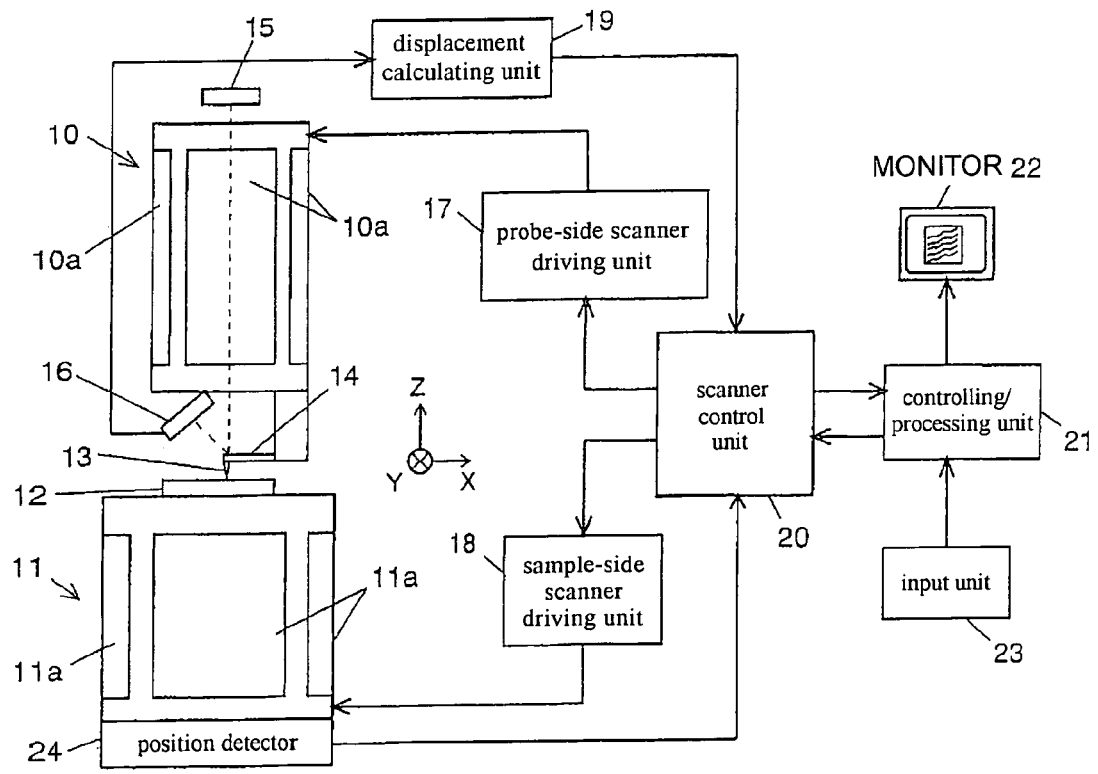
FIG. 2 is a schematic structure view of the structure of an AFM according to the second embodiment of the present invention.
Figure 3:
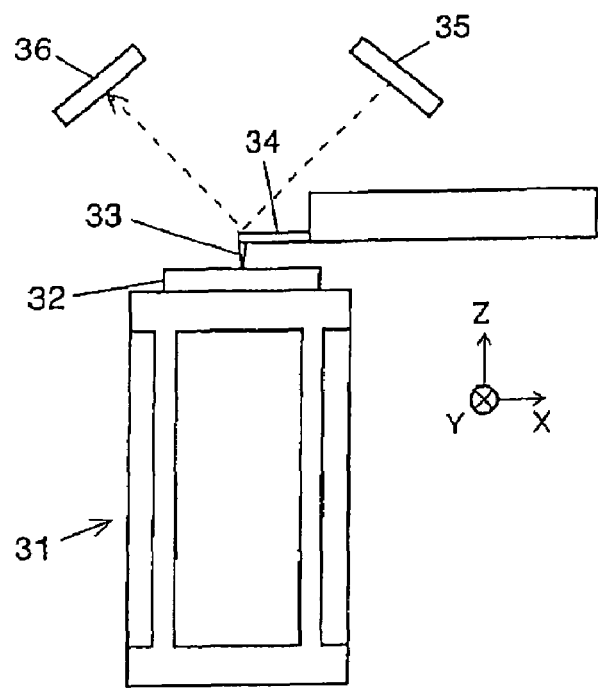
FIG. 3 is a schematic view of an example of a conventional AFM.
Figure 4:
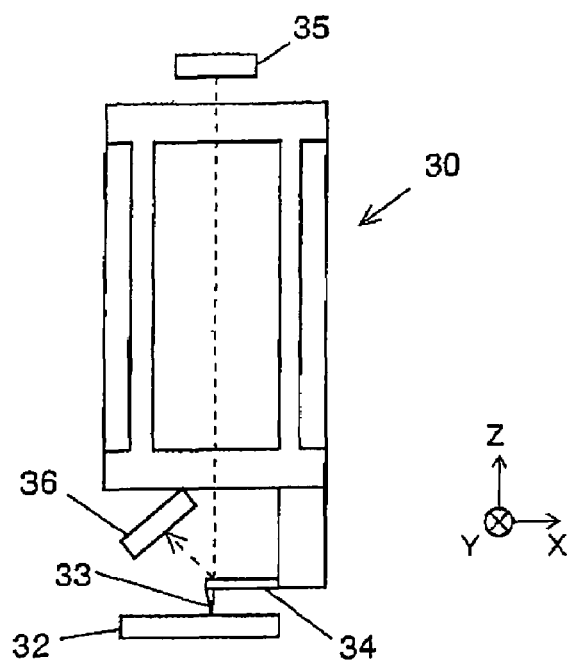
FIG. 4 is a schematic view of another example of the conventional AFM.

FIG. 1 shows a schematic structure of a SPM i.e., an atomic force microscope (AFM) according to the embodiment of the present invention. The AFM of this embodiment is provided with a sample-side scanner 11 with a sample 12 mounted thereon. The sample-side scanner 11 is used for scanning the sample 12 in the X-Y axis directions and moving the sample 12 in the Z-axis direction. The AFM of this embodiment is further provided with a probe-side scanner 10 disposed on a cantilever 14 with a probe 13, wherein the probe-side scanner 10 is used for scanning the probe 13 in the X-Y axis direction, and moving the probe 13 in the Z-axis direction.

The maximum scan range of the probe-side scanner 10 is different from that of the sample-side scanner 11. A scanner with a relatively large maximum scan range (scanner used for wide-range scanning) is used as the sample-side scanner 11, and a scanner with a relatively small maximum scan range (scanner used for narrow-range scanning) is used as the probe-side scanner 10.

The probe-side scanner 10 and the sample-side scanner 11 are respectively connected to a probe-side scanner driving unit 17 and a sample-side scanner driving unit 18. A suitable voltage is applied to the piezoelectric elements 10a, 11a of each scanner by each scanner driving unit according to the signals from the scanner control unit 20, thereby driving each scanner in the X-, Y-, Z-axis directions.

In the embodiment, the AFM is provided with a displacement calculating unit 19. A magnitude of displacement of the cantilever 14 is calculated by the displacement calculating unit 19 according to a detection signal from an optical detector 16 of a displacement detection system, and is input to the scanner control unit 20. By maintaining an atomic force between the probe 13 and the sample surface always constant, i.e., maintaining a distance between the probe 13 and the sample surface constant, a voltage value for displacing the probe-side scanner 10 or the sample-side scanner 11 in the Z-axis direction is calculated by the scanner control unit 20 according to the magnitude of displacement. The probe-side scanner 10 or the sample-side scanner 11 is moved slightly in the Z-axis direction through the probe-side scanner driving unit 17 or the sample-side scanner driving unit 18.

The scanner control unit 20 calculates the voltage values in the X-axis, Y-axis directions according to a predetermined scanning pattern, such that the sample 12 is moved relatively to the probe 13 on the X-Y plane, and the scanner is moved slightly in the X-axis and Y-axis directions through the probe-side scanner driving unit 17 or the sample-side scanner driving unit 18.

The signal indicating a feedback amount (scanner voltage) in the Z-axis direction is also sent to a controlling/processing unit 21. The controlling/processing unit 21 reproduces a three-dimensional image of the sample surface at each position in X-axis, Y-axis directions by processing the signal, and depicts the three-dimensional image on a monitor 22. Furthermore, the controlling/processing unit 21 is functioned through a specific software being installed on a general purpose computer, and the operator's instruction being input to the controlling/processing unit 21 through a keyboard, mouse, or other input unit 23 connected thereto.

In the embodiment, when the sample is observed by the AFM, specific operations are carried out by the operator through the input unit 23, thereby selecting an appropriate scanner corresponding to the size of the area to be observed. When the probe-side scanner 10 is selected, the driving signal from the scanner control unit 20 is sent to the probe-side scanner driving unit 17, and then the voltage corresponding to the driving signal is applied to each piezoelectric element 10a of the probe-side scanner 10. When the sample-side scanner 11 is selected, the driving signal is sent to the sample-side scanner driving unit 18, and then the voltage corresponding to the driving signal is applied to each piezoelectric element 11a of the sample-side scanner 11. When observing in a narrow range, the probe-side scanner 10 with a relatively small maximum scan range is used to obtain an image, without using the sample-side scanner 11. When observing in a wide range, the sample-side scanner 11 with a relatively large maximum scan range is used to obtain an image, without using the probe-side scanner 10.

Furthermore, the above scanners are not selected by the operation. Instead, the controlling/processing unit 21 automatically determines which scanner to use according to the size of the observation range input by the operator, and sends an instruction to the scanner control unit 20.

Depending on the size of the area to be observed, not only the probe-side scanner 10 and the sample-side scanner 11 can be used separately as described above, they can also be used together. In other words, the probe-side scanner 10 is used to scan in a narrow range for obtaining an image, and the sample-side scanner 11 is used to move the field of view. Therefore, a high resolution can be maintained on one hand, while observing in a wide range can be carried out. In such a case, the scanner control unit 20 outputs a driving signal to the probe-side scanner driving unit 17, for scanning the sample surface and obtaining an image. Meanwhile, the scanner control unit 20 outputs a driving signal to the sample-side scanning driving unit 18, for making the sample 12 to move towards any position. The magnitude of displacement of the sample 12 caused by the sample-side scanner is calculated by the controlling/processing unit 21 according to the settings made by the operator via the input unit 23, and is sent to the scanner control unit 20.

Additionally, when the field of view is moved due to the heat drift, etc., through the controlling/processing unit 21 the same part of the sample is extracted from two successive images, and then the displacement of the field of view and the direction of the part are calculated automatically. Furthermore, the magnitude of displacement of the sample 12 in the view-field moving correction direction is calculated from the information by the controlling/processing unit 21, and the result is sent to the sample-side scanner 11 via the scanner control unit 20. Therefore, in a next image, since the sample 12 is moved in an opposite direction but with a same magnitude of displacement caused by the drift, a movement of the sample 12 is not observed on the monitor 22. Accordingly, with the AFM of this embodiment, the probe-side scanner 10 with a relatively small maximum scan range can be used for observing at high resolution, while the sample-side scanner 11 with a relatively large maximum scan range is used for correcting the drift. Therefore, it is possible to carry out an observation at high resolution for a long time period while the same field of view is maintained.

Embodiment 2

The AFM of this embodiment is provided with a position sensor 24, for detecting a position of the sample-side scanner 11 in the AFM of the Embodiment 1. With this configuration, a signal from the position sensor 24 can be fed back to the scanner control unit 20, for compensating the scale error caused by the non-linearity of the piezoelectric elements. According to the AFM of this embodiment, as described above, even though the sample-side scanner 11 and the probe-side scanner 10 are used together to perform a wide range observation at high resolution, the sample 12 can move in wide range while maintaining a linear state. Therefore, it is possible to correctly position the sample and observe the sample at high resolution, which is difficult to achieve with the prior art.

Although the preferable configurations for implementing the present invention have already been illustrated through the embodiments, the present invention is not limited to the embodiments described above, and various variations can be made within the scope of the present invention. For example, the construction of the present invention is not limited to the AFM in the above embodiments, and the scanning tunneling microscope (STM) and other SPMs also can be used. Also, opposite to above embodiments, a scanner with a small maximum scan range can be used as the sample-side scanner, and a scanner with a large maximum scan range can be used as the probe-side scanner. In such a case, the probe-side scanner is used when the field of view is moved due to a drift correction, etc. as described above.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A scanning probe microscope (SPM), used for scanning a sample surface with a tiny probe to detect a three-dimensional shape and physical quantity of the sample surface, comprising:

a) a probe moving device, for moving the probe in X-, Y-, and Z-axis directions; and b) a sample moving device, for moving the sample in the X-, Y-, and Z-axis directions; and wherein a movable range of the sample moving device in an X-Y axis direction is larger than that of the probe moving device in the X-Y axis direction.

2. The SPM as claimed in claim 1, further comprising:

c) a narrow range observing unit, for obtaining data of the sample surface by utilizing the probe moving device; and d) a wide-range observing unit, for obtaining the data of the sample surface by utilizing the sample moving device, wherein through switching between the narrow range observing unit and the wide range observing unit, a coverage of a field of view is changed.

3. The SPM as claimed in claim 2, further comprising:

e) a position sensor, for detecting a position of the sample moving device; and f) a non-linearity correction unit, for correcting a non-linearity of the sample moving device according to position information of the sample moving device detected by the position sensor.

4. The SPM as claimed in claim 3, further comprising:

g) a drift detection unit, for detecting a displacement direction and a displacement magnitude of the field of view caused by a heat drift; and h) a drift correction unit, for correcting the heat drift by controlling the sample moving device according to the displacement direction and the displacement magnitude of the field of view detected by the drift detection unit.

5. The SPM as claimed in claim 2, further comprising:

g) a drift detection unit, for detecting a displacement direction and a displacement magnitude of the field of view caused by a heat drift; and h) a drift correction unit, for correcting the heat drift by controlling the sample moving device according to the displacement direction and the displacement magnitude of the field of view detected by the drift detection unit.

6. The SPM as claimed in claim 1, further comprising:

c) a narrow range observing unit, for obtaining data of the sample surface by utilizing the probe moving device; and d) a view-field moving unit, for moving a field of view by utilizing the sample moving device, wherein the field of view is moved by the view-field moving unit, and the data of the sample surface is obtained through the narrow range observing unit.

7. The SPM as claimed in claim 6, further comprising:

e) a position sensor, for detecting a position of the sample moving device; and f) a non-linearity correction unit, for correcting a non-linearity of the sample moving device according to position information of the sample moving device detected by the position sensor.

8. The SPM as claimed in claim 7, further comprising:

g) a drift detection unit, for detecting a displacement direction and a displacement magnitude of the field of view caused by a heat drift; and h) a drift correction unit, for correcting the heat drift by controlling the sample moving device according to the displacement direction and the displacement magnitude of the field of view detected by the drift detection unit.

9. The SPM as claimed in claim 6, further comprising:

g) a drift detection unit, for detecting a displacement direction and a displacement magnitude of the field of view caused by a heat drift; and h) a drift correction unit, for correcting the heat drift by controlling the sample moving device according to the displacement direction and the displacement magnitude of the field of view detected by the drift detection unit.

* * * * *